May 7, 1968 P. ECKSTEIN 3,381,417

DEVICE FOR LAPPING CUTTING TOOLS

Filed March 26, 1965 3 Sheets-Sheet 1

INVENTOR
Philipp Eckstein

By Browne, Schuyler & Beveridge

May 7, 1968 P. ECKSTEIN 3,381,417
DEVICE FOR LAPPING CUTTING TOOLS
Filed March 26, 1965 3 Sheets-Sheet 2

INVENTOR
Philipp Eckstein

By
Browne, Schuyler & Beveridge

May 7, 1968 P. ECKSTEIN 3,381,417

DEVICE FOR LAPPING CUTTING TOOLS

Filed March 26, 1965 3 Sheets-Sheet 3

INVENTOR
Philipp Eckstein

By
Browne, Schuyler & Beveridge

United States Patent Office 3,381,417
Patented May 7, 1968

3,381,417
DEVICE FOR LAPPING CUTTING TOOLS
Philipp Eckstein, Frankfurt am Main, Germany, assignor to Gustav Goekel Maschinenfabrik G.m.b.H., Frankfurt am Main, Germany
Filed Mar. 26, 1965, Ser. No. 442,883
6 Claims. (Cl. 51—116)

ABSTRACT OF THE DISCLOSURE

This invention relates to a honing or lapping device which can be used to hone the cutting edges of very large industrial knives or cutting tools where the blades are as thick as one inch and as long as 20 feet. The device mounts two opposing groups of rotating lapping rings spaced apart along a line on hinged heavy frames which are angularly disposed such that the plane of the front faces of opposing lapping rings intersect at an acute angle, with opposing guide rollers being mounted on the frames to include the same angle between the rollers as is included between opposing lapping ring faces.

---

The invention relates to a device having rotatable lapping discs or rings for lapping angled edges, and more particularly cutting tool edges.

During the grinding of acutely angled edges, especially the cutting edges of cutting tools, there remains always a small but undesirable burr which must be removed after the grinding. To this end, the cutting edges are honed or dressed towards both sides with oil stone. Usually the oil stone is passed along the cutting edge with oscillating movements. This work is laborious, time wasting and tiring and requires know how and experience. In addition, it can be dangerous, because the sharp edges can easily cause cuts. In a tool grinding shop the honing of the cutters presents a high item of expenditure. Attempts have been made to arrange for this work to be carried out by machines, but the machines developed for this purpose are very expensive so that their purchase is justified only in very rare cases. After grinding, the knives must again be chucked and aligned in these machines, and this must be carried out by expert labor.

The present invention has the object of providing a device, especially for removal of grinding burr on tool edges, which is inexpensive and easy to operate. This device contains two facing groups of spaced, lapping discs or rings in which the discs of each group are in a line and the groups are inclined one to the other. A workpiece to be machined may be easily introduced between the rotating lapping discs or rings and their intersecting projections so that the edge of the cutter penetrates to the apex of the angle formed by the lapping discs or rings. The tool edge is ground simultaneously at several points, and by slightly moving it to and fro, a uniform deburring of the whole cutting edge may be achieved. According to the length of the cutter edges to be treated, the groups of lapping rings may be made as large as required so that a few basic types are sufficient for many sizes of apparatus. This creates conditions for economical production, and the possibility of enlarging up to the maximum size for each basic type enabling the savings of the unit system to be utilized. By using a suitable cover for the lapping rings, the possibilities of injuries to personnel from the lapping device and from the blade are effectively prevented.

In a preferred embodiment, the two groups of lapping discs or rings are so arranged at an angle that the effective lapping zones of the one group alternate with the effective lapping zones of the other group. This staggered arrangement of the lapping rings enables a uniform ring size to be used for both groups. With a uniform peripheral velocity of the rings, desirable for a good lapping result, a uniform wear of all rings may be produced. This guarantees the good uniform treatment of the tool edge to be lapped, and, in view of the uniform size of the replacement rings or discs, the storing space may be reduced to a minimum.

In another embodiment, the two groups of lapping rings are so arranged at an angle that zones of one group of rings protrude into recesses in the associated rings of the other group. Although this arrangement requires that the lapping rings or discs of the one group, which project into cavities of the other, to be smaller, this paired construction permits setting up very small lapping devices with a single pair of rings or discs which enables good results to be produced owing to the symmetry of the effective zones of the rings and without special tool guides.

Special advantages result if the angle between the two groups of lapping rings is adjustable. In this case, with different ground angles of the cutters, the optimum processing angles may be chosen between groups of rings or discs so as to obtain an optimum result. Conveniently, the angle guide for the lapping rings is so designed that the apex of the angle, which is formed by the planes of the lapping rings or discs, does not change its position relative to the lapping device. In this way, the machining depth to which the tool must be inserted, is constant and independent of the adjusted angle.

Further advantages result if the individual lapping rings are axially resiliently mounted. During the introduction of the tool, the rings may give slightly so that even minute and unavoidable tolerances in the ring adjustment or in the wear of the rings can be automatically equalized. Thus, all lapping rings or discs rest uniformly against the tool. In addition, a guide acting as stop can be so arranged that during the insertion of the tool, the lapping rings yield slightly and operate with the required contact pressure.

Moreover, with this automatic equalization, the intervals between adjustments of the lapping rings may be extended.

For special purposes it may be desirable to change the aperture angle of the gap formed by the lapping rings or discs. In this way, the device may be used for continuous lapping. Then, the lapping may be started with a certain starting angle, and gradually during the advance along the tool feed, the tool may pass to the fine lapping and finishing stations. During the gradual transition to fine lapping, the degree of fineness of the lapping discs may be adapted to the desired result. If the lapping rings of each group are adjustable individually in their angles, the device may be accurately adapted to any desired lapping conditions: constant lapping angle or variable lapping angle with different angular adjustment. It may also be an advantage if the lapping rings rotate at different speeds. When the device is used as a lapping train, the speed of the individual lapping rings could be increased from the start to the end of the train, i.e., towards the fine lapping. It may also be convenient to choose the sense of rotation of the two groups, or even of individual rings, differently. The common drive of the lapping rings may be, for example, a belt or chain drive, or a gear drive, possible with a reduction gearing as in a lathe, for selecting different speeds of the individual lapping discs.

A preferred embodiment of the invention comprises a tool guide for limiting the penetration of the tool edge into the angular gap. In this manner, the depth of penetration may be accurately fixed and adjusted to the apex of the angle so that a positive uniform processing of the whole tool edge or edges of different tools is achieved. The tool guide may be formed, for example, by two twin rollers arranged at an angle. Two cooperating rollers may be so arranged adjacently or opposite one another in the frames receiving the lapping ring groups that they include an angle corresponding to that formed by the lapping rings. Conveniently, the arrangement is such that the edge of the tool to be lapped does not make contact with the rollers but is guided thereby along the two cutting faces on either side so that damage to the edge and the guide rollers is avoided. In an arrangement in the form of a lapping train several such guide and support rollers will be provided alongside the train. This supporting arrangement may also be adjustable so that selectively lapping of the tool edge is possible only from one side.

Conveniently, the device may be equipped with a wetting device for cleaning the lapping rings and maintaining their grip.

The invention will be further described, by way of example, with reference to the accompanying drawings, in which.

Figure 1:
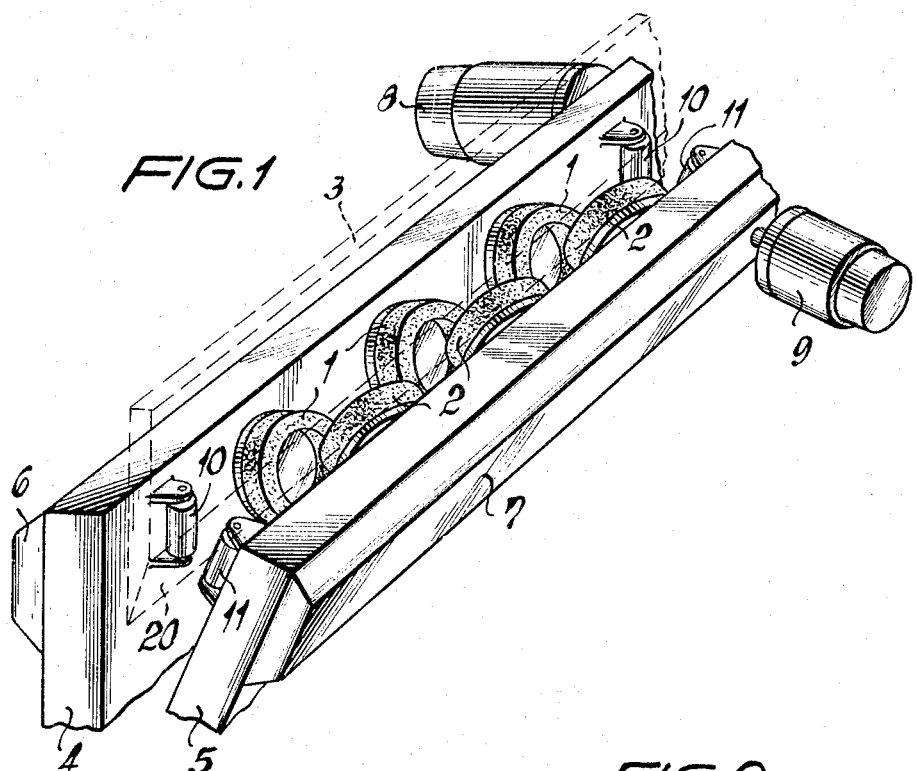
FIGURE 1 is a diagrammatic perspective view of a lapping device according to the invention.
Figure 2:
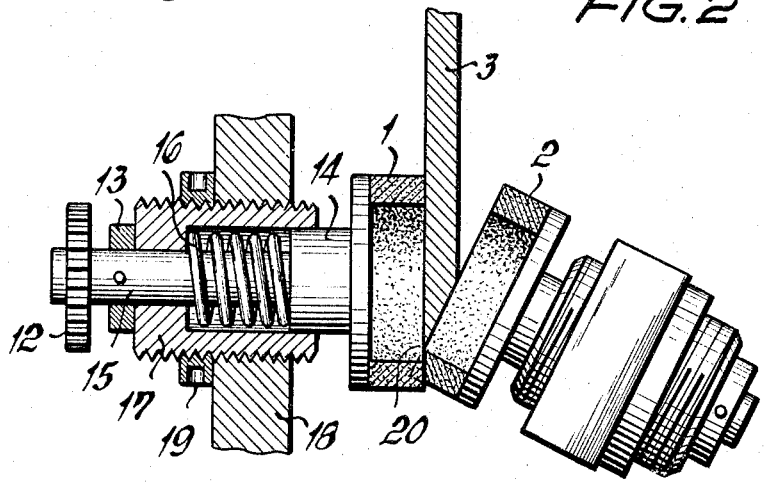
FIGURE 2 is an embodiment of a lapping ring mounting.

Groups of lapping rings 1 and 2 are so located in frame parts 4 and 5 according to FIGURE 1 that the planes of the rings include an angle whose intersection, as shown in FIGURE 2, representing the machining line for the tool 3, is located in the projection within the zone of the lapping rings. The workpiece 3 is guided by pairs of guide rollers 10, 11 so arranged on the frame parts 4, 5 that they guide the tool along both side faces without contact with the cutting edge. A common drive for each group of lapping rings is mounted in gear boxes 6 and 7 and connects the axes of the lapping rings with drive motors 8 and 9, respectively. This may be a gear drive in which the gears drive all rings at the same speed in the same direction or the gearing may be such that rings are driven at different speeds and/or in different directions, as previously noted in the specification.

Figure 3:
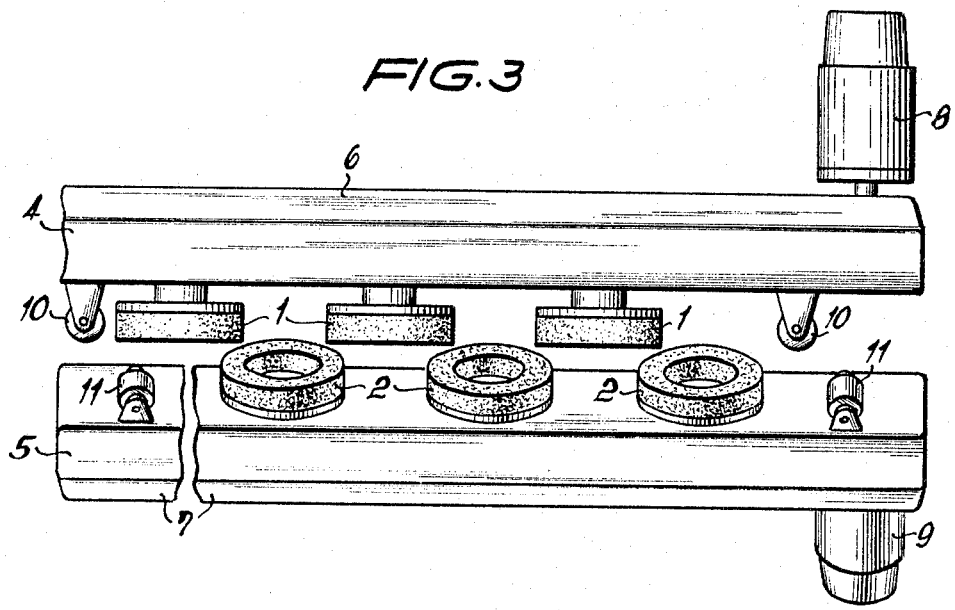
FIGURE 3 is a diagrammatic top view of the device shown in FIGURE 1.
Figure 4:
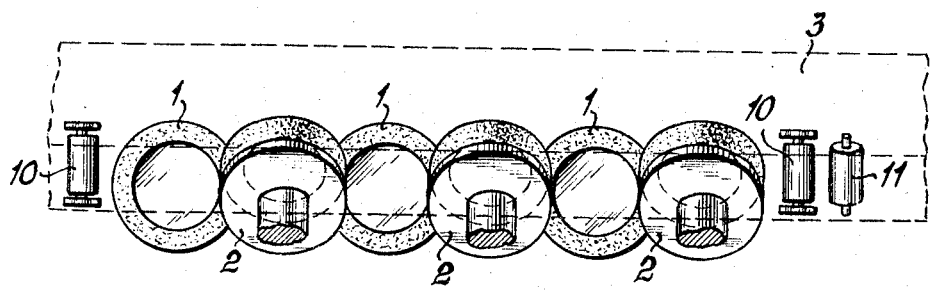
FIGURE 4 is a diagrammatic side elevation of the device shown in FIGURE 1.

The lapping rings are axially resiliently mounted and one embodiment is shown in FIGURE 2. A bearing housing 17 has an external thread and is screwed into the frame member 18. It is secured against accidental rotation by a lock-ring 19. A spindle 15, carried by the bearing housing 17 has on its end adjacent the lapping rings a projection 14 and a spring 16 located within the bearing house bears against this projection. A stop ring 13 near the other end of the spindle is urged against the housing by the spring 16 with the ring 1 in its normal unloaded position. The spindle 15 of the lapping ring is driven by a gear wheel or sprocket 12. The lapping ring 2 which is located behind the ring 1 forms such an angle with the lapping ring 1 that the defining planes of the lapping rings intersect one another at 20 at the cutting edge of the tool. FIGURE 3 shows in a top view the relationship between lapping ring groups 1 and 2. In conjunction with FIGURE 2, the overlapping arrangement of the rings may here be easily seen. The diagrammatic side elevation of FIGURE 4 shows in outline the workpiece 3 in position between the groups of rings 1 and 2, and guided by the pairs of guide rollers 10, 11.

Figure 5:
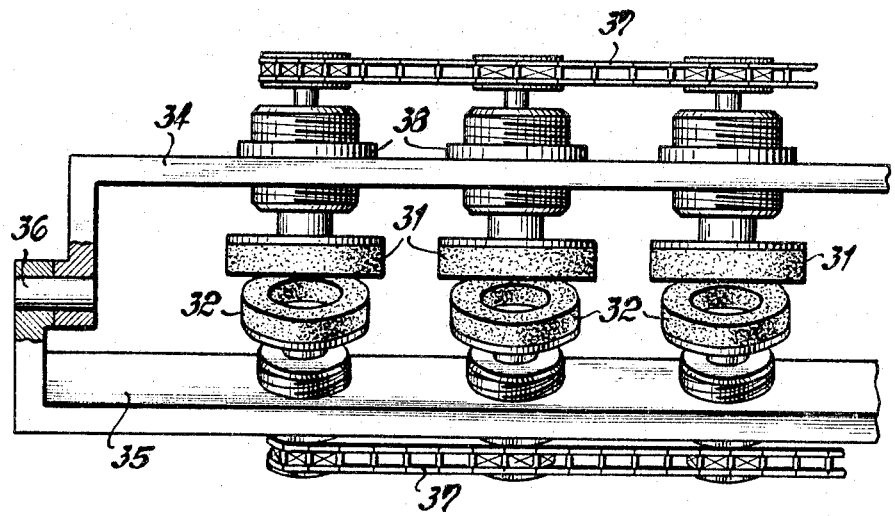
FIGURE 5 shows diagrammatically another embodiment of the invention.
Figure 6:
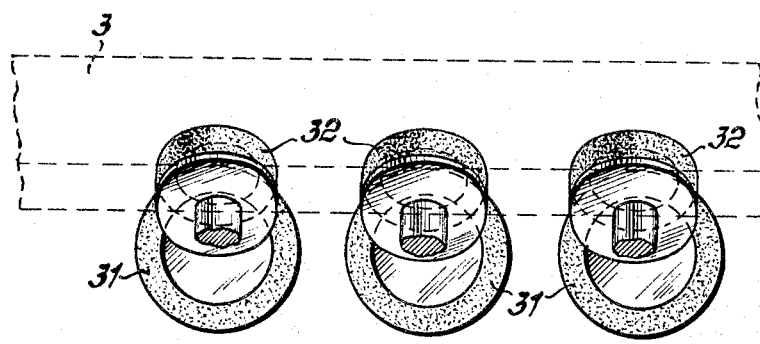
FIGURE 6 is a diagrammatic side elevation of the embodiment shown in FIGURE 5.

FIGURE 5 shows an embodiment with paired lapping rings 31 and 32. The smaller rings 32 rotate partly within cavities of the larger rings 31. Frame members 34 and 35 receive the mountings 38 for the lapping rings 34 and 32. By means of articulated joints, the frame members 34 and 35 may be so pivoted relative to one another about a pivot pin 36 joining each end of the frame member so as to alter the angle formed by the lapping rings and establish a common axis of rotation so that the apex of the angle formed by the planes of the lapping rings does not change its position as the frames are pivoted. The chain drive 37 indicates the common drive for the lapping rings. In the diagram in FIGURE 6, the tool 3 is shown in outline during the treatment between the lapping rings 31 and 32.

For lapping, the workpiece 3 to be deburred is introduced in the embodiment of FIGURE 1 from the top into the angular gap formed by the groups 1 and 2 of lapping rings. During this, its knife edge 20 makes first slight contact with the effective ranges of the lapping rings 1 and 2 of both groups. During the further pressing in, the side faces rest against the guide rollers 10 and 11, whilst the edge 20 freely protrudes therebetween. The resiliently mounted lapping rings 1 and 2 are slightly urged by the edge 20 axially towards the sides and rest under the pressure of the spring 16 against the edge 20 in order to deburr the same. By rotating the bearing housing 17 in the frame member 18, the inoperative position of the spindle may be so adjusted that, when the workpiece rests within the defining guide rollers 10, 11, the spring 16 is so far compressed that the lapping ring is urged against the edge to be machined with the required force.

The two frame parts 4 and 5 are adjustable by means of an adjusting mechanism, similar to the articulated joint and pivot 36 shown in FIGURE 5, to an angle corresponding to that of the knife edge to be treated. During this angular adjustment, the apex of the angle formed by the lapping rings remains preferably in its position. To this end, the adjusting device has substantially the shape of a circular guide, such as the circular pivot pin 36 of FIGURE 5, the center of which coincides with the apex of the angular gap, and which presents no obstacle to the lateral movement of the workpiece 3 during the lapping. The workpiece 3 fully inserted into the lapping device is moved to and fro during the lapping so that the whole edge 20 is uniformly lapped. For checking, the workpiece may be easily extracted from the device and tested. A reliable cover is used, but has not been shown in the drawing for the sake of clarity. The operation and function of the appliance also applies to the embodiment shown in FIGURES 5 and 6.

It should be understood that the foregoing disclosure relates only to preferred embodiments of the invention and that numerous modifications or alterations are possible without departing from the spirit and scope of the invention as set forth in the following claims.

What is claimed is:

1. In a device for lapping the angled cutting edges of heavy tools comprising two oppositely disposed groups of rotating lapping rings with flat, front lapping faces mounted on supports to have the plurality of rings of each group spaced apart along a line such that the plane of oppositely disposed lapping faces intersect at an acute angle, the improvements of each ring operatively connecting to rotating means for rotating said ring about an axis perpendicular to its lapping face, said supports for mounting said groups of rings comprising two oppositely disposed heavy frames capable of receiving large industrial knives with the frames being angularly disposed and connected by common pivots so as to be rotatable relative to each other about a common axis of rotation, and oppositely disposed tool guiding rollers rotatably supported on the mutually facing sides of each said frame with the bearing surfaces and axes of rotation of said rollers being parallel to the lapping face rings supported by the same frame so that the angle included between the opposing rollers is said acute angle.

2. The device described in claim 1 wherein said ring rotating means includes means for rotating individual rings in opposite directions.

3. The device described in claim 1, wherein each said lapping ring is affixed to the end of a support spindle having a shoulder adjacent said ring, said frames each having a plurality of spaced threaded openings into which is screwed a hollow bearing housing, each said housing having a recess extending partially along its length from one end and of a diameter to accommodate said spindle shoulder with the other end of said housing and said recess being connected by an opening which defines a bearing surface supporting said spindle extending through said housing, a spring circumscribing said spindle contained within said recess between said spindle shoulder and the inner recess wall, a stop affixed to said spindle to engage the exterior of said housing other end to limit the longitudinal motion of said spindle and shoulder within said recess occasioned by the expansion of said spring, said spindle beyond said stop being connected to said rotation means, and a locking ring threaded onto said housing to engage said frame and lock said housing in a predetermined longitudinal position.

4. The device of claim 1 wherein the rings of one group are annular with a central hollow space and the rings of the other group are mounted oppositely to extend partially into said hollow spaces of the opposite ring.

5. The device of claim 1 wherein the angle included between said faces of opposing rings changes along the line of rings.

6. The device of claim 1 wherein said ring rotation means includes means for rotating individual rings at different speeds.

References Cited

UNITED STATES PATENTS

| | | | |
|---|---|---|---|
| 1,027,005 | 5/1912 | Seymour. | |
| 1,090,577 | 3/1914 | Sheehan | 51—112 |
| 1,134,587 | 4/1915 | Gallahan | 51—354 |
| 1,606,813 | 11/1926 | Schultz | 51—111 |
| 1,909,743 | 5/1933 | Blanker | 51—354 |
| 1,914,013 | 6/1933 | Gaisman. | |
| 2,420,814 | 5/1947 | Clark | 51—354 X |

HAROLD D. WHITEHEAD, *Primary Examiner.*

UNITED STATES PATENT OFFICE
CERTIFICATE OF CORRECTION

Patent No. 3,381,417 May 7, 1968

Philipp Eckstein

It is certified that error appears in the above identified patent and that said Letters Patent are hereby corrected as shown below:

In the heading to the printed specification, lines 3 to 5, "Frankfurt am Main, each occurrence, should read -- Darmstadt --.

Signed and sealed this 17th day of March 1970.

(SEAL)
Attest:

Edward M.Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,381,417      Dated May 7, 1968

Inventor(s) Philipp Eckstein

It is certified that error appears in the above-identified patent and that said Letters Patent are hereby corrected as shown below:

The name of the assignee is Gustav Göckel Maschinenfabrik G.m.b.H. with an umlaut over the "o" in lieu of Gustav Gockel Maschinenfabrik G.m.b.H. as now shown in the heading of the patent.

SIGNED AND SEALED
NOV 3 1970

(SEAL)
Attest:

Edward M. Fletcher, Jr.
Attesting Officer

WILLIAM E. SCHUYLER, JR.
Commissioner of Patents